United States Patent [19]

Wittmer

[11] Patent Number: 4,660,977
[45] Date of Patent: Apr. 28, 1987

[54] SYNCHRONOUS WAVELENGTH DRIVE AND DATA ACQUISITION CONVERSION FOR A SEQUENTIAL SPECTROPHOTOMETER

[75] Inventor: Charles M. Wittmer, Trumbull, Conn.

[73] Assignee: The Perkin-Elmer Corporation, Norwalk, Conn.

[21] Appl. No.: 704,344

[22] Filed: Feb. 22, 1985

[51] Int. Cl.$^4$ .............................................. G01J 3/42
[52] U.S. Cl. .................................... 356/319; 364/498
[58] Field of Search ............... 356/319, 323, 325, 326, 356/328, 331, 334; 364/498

[56] References Cited

U.S. PATENT DOCUMENTS

| 3,868,499 | 2/1975 | Aaronson et al. | 356/334 X |
| 3,985,442 | 10/1976 | Smith et al. | 356/328 X |
| 4,000,946 | 1/1977 | Way et al. | 356/321 |
| 4,037,960 | 7/1977 | Macemon | 356/73 |
| 4,293,222 | 10/1981 | Caruso et al. | 356/320 |
| 4,305,664 | 12/1981 | Akitomo | 356/323 |
| 4,318,615 | 3/1982 | Saqusa et al. | 356/320 |
| 4,332,470 | 6/1982 | Chamran et al. | 356/325 |
| 4,412,744 | 11/1983 | Lee et al. | 356/319 |

OTHER PUBLICATIONS

Longerich et al, *Analytical Chemistry*, vol. 46, No. 13, Nov. 1974, pp. 2067–2071.
Coolen et al, *Analytical Chemistry*, vol. 47, No. 9, Aug. 1975, pp. 1649–1655.
Aaronson et al, *American Laboratory*, vol. 7, No. 9, Sep. 1975, pp. 57–63.

*Primary Examiner*—F. L. Evans
*Attorney, Agent, or Firm*—Ronald G. Cummings; Francis L. Masselle; Edwin T. Grimes

[57] ABSTRACT

A sequential spectrophotometer system having a light source, a scanning type monochromator, a stepper motor means for changing the monochromator wavelength over a light spectrum being scanned, a photomultiplier for measuring the intensity of light absorption or passage through a sample being tested and generating a signal corresponding thereto, data acquisition means for compiling data corresponding to said signals and means for recording such data generally as a function of light measured for each wavelength, the improvement comprising:

a method and means to effect the data acquisition conversion at or about each desired wavelength during a respective stepper motor rotor displacement period, i.e., during each corresponding period of diffraction grating vibration or oscillation following a stepper motor disposition thereof to another wavelength position angle.

12 Claims, 4 Drawing Figures

SYNCHRONOUS WAVELENGTH DRIVE AND DATA ACQUISITION CONVERSION FOR A SEQUENTIAL SPECTROPHOTOMETER

FIELD OF THE INVENTION

The present invention relates to spectrophotometers and, more particularly, to a sequential spectrophotometer system improvement and method for increasing sample analysis speed.

PRIOR ART STATEMENT

Various spectrophotometer systems have hitherto been proposed.

The conventional spectrophotometers which utilize a stepper motor for controlling the wavelength drive effect data acquisition of a sample under test with the diffraction grating of a monochromator being designed to be at rest at a predetermined (angular) position relative to a (light) slit corresponding to each predetermined light wavelength being utilized for analysis of the sample.

The prior art includes several prior art patent references of particular interest. For example, U.S. Pat. No. 4,037,960 issued in July 26, 1977 to James H. Macemon discloses a digitally settable selective control for speed of wavelength scan or for time base scan. The controller furnishes a stepping signal of selected periodicity, for application to a stepping motor, which changes the wavelength adjustment of the spectrophotometer at a rate determined by the selected periodicity. The spectrophotometer furnishes to the plotter-scriber an analog voltage varying with the instantaneous wavelength setting of the spectrophotometer.

Another prior art patent reference of particular interest is U.S. Pat. No. 4,000,946 issued Jan. 4, 1977 to Allan S. Way et al. This patent discloses a tracking accuracy control system for a spectrophotometer utilizing stepper motors for controlling the wavelength drive and chart drive system.

Other prior art patents of general interest include U.S. Pat. Nos.: 4,305,664 issued Dec. 15, 1981 to Nubuo Akitomo; 4,412,744 issued Nov. 1, 1983 to Jerald D. Lee et al; 4,318,615 issued Mar. 9, 1982 to Hisayuki Sagusa et al; and 4,293,222 issued Oct. 6, 1981 to Stephen Caruso et al.

The above noted patent references are mentioned as being representative of the prior art and other pertinent references may exist. None of these patents are deemed to affect the patentability of the present claimed invention. The teachings of above cited patents are incorporated into the present application by reference to the extent necessary.

Accordingly, several serious disadvantages have existed with the prior art spectrophotometers which, to highlight, a few, include limitations on the speed of data throughput or scan rate, line frequency noise or error, mechanical ringing noise and stray light noise.

The present invention involves a novel method, approach and means to afford a substantial solution to the difficulties, problems and generally slow processing scan rate hitherto existing with the prior art spectrophotometers.

For example, in total contrast to the prior art, the present invention provides a sequential spectrophotometer having synchronous wavelength drive and data acquisition conversion. Another distinguishing feature of the present invention is that data acquisition conversion is performed during each corresponding vibration period of the grating and rotor following a stepper motor displacement of the grating to the next wavelength grating and rotor position. Yet another distinguishing feature of the present invention is that data acquisition conversion and wavelength drive are each synchronized to the line frequency thereby substantially reducing noise on the output data.

SUMMARY OF THE INVENTION

Generally speaking, and in accordance with the invention a sequential spectrophotometer system is provided having a light source, a scanning type monochromator, a stepper motor means for changing the monochromator wavelength over a light spectrum being scanned, a photomultiplier for measuring the intensity of light absorption or passage through a sample being tested and generating a signal corresponding thereto, data acquisition means for compiling data corresponding to said signals and means for recording such data generally as a function of light measured for each wavelength, the improvement comprising:

a method and means to effect the data acquisition conversion at or about each desired wavelength during a respective stepper motor rotor displacement period, i.e., during each corresponding period of diffraction grating vibration or oscillation following a stepper motor disposition thereof to another wavelength position angle-of-diffraction.

Accordingly, it is an object of the present invention to provide a new and improved spectrophotometer system.

It is a further object of the present invention to provide a synchronous wavelength drive and data acquisition means for a sequential spectrophotometer.

It is a further object of the present invention to provide a means for effecting data acquisition conversion during a respective stepper motor rotor oscillation period at each predetermined respective rotor step position.

It is a further object of the present invention to provide a sequential spectrophotometer having a relatively fast scan rate or high speed of data throughput.

It is a further object of the present invention to provide a sequential spectrophotometer wherein the data acquisition conversion and wavelength drive are synchronized to the line frequency.

BRIEF DESCRIPTION OF THE DRAWINGS

Other objects and advantages of the present invention will be evident from the following detailed description when read in conjunction with the accompanying drawings which illustrate the preferred embodiment of the present invention.

DESCRIPTION OF THE PREFERRED EMBODIMENT

Figure 1:
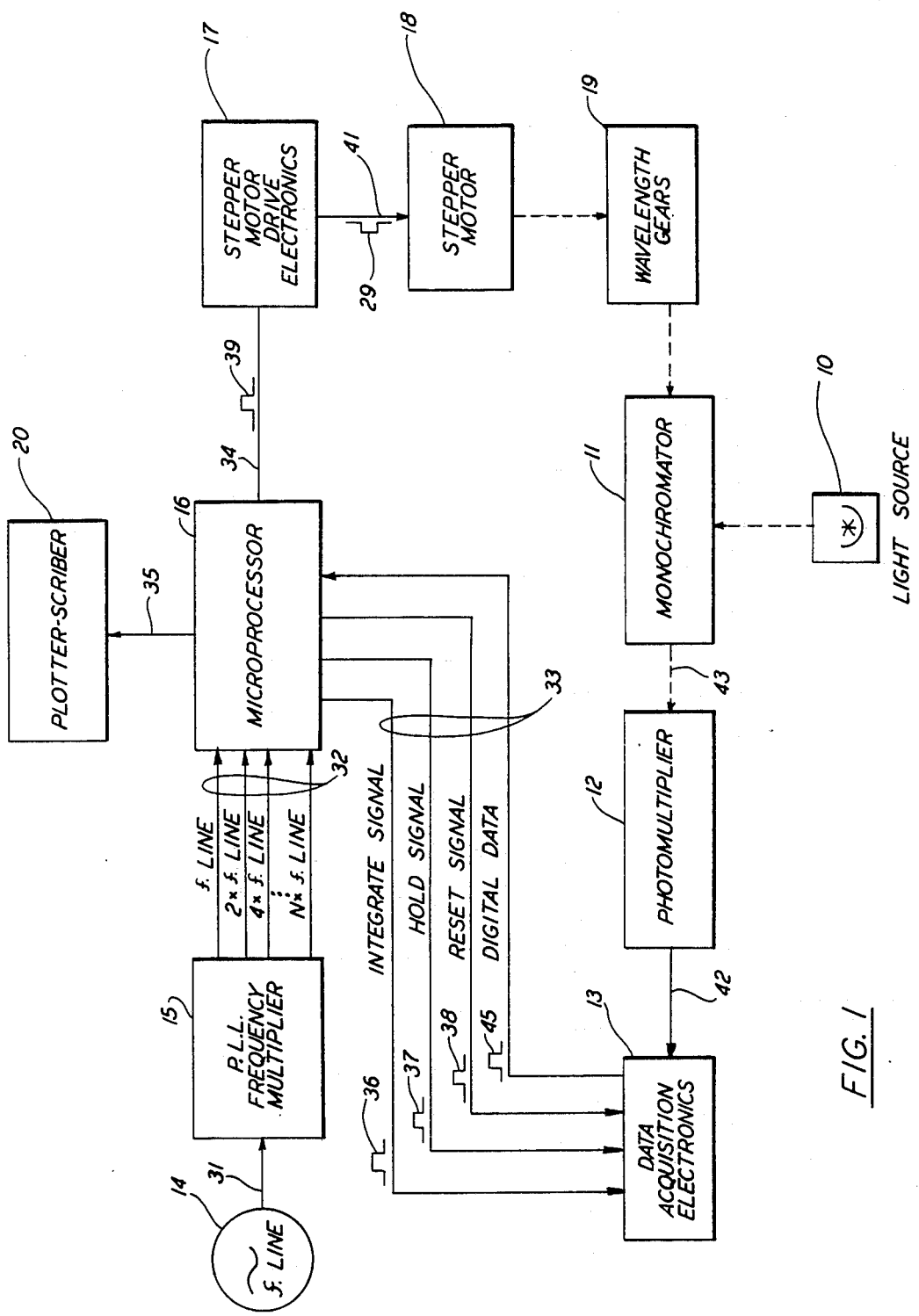
FIG. 1 is a block diagram showing the construction of the sequential spectrophotometer in accordance with an embodiment of the invention.

Referring now to the drawings, and particularly to FIG. 1, the apparatus includes a light source 10, a monochromator 11, a photomultiplier 12, data acquisition electronics 13, a power source 14, a phase lock loop frequency multiplier circuit 15, a microprocessor 16, stepper motor drive electronics 17, a stepper motor 18, wavelength gears 19 and a plotter-scriber or recorder 20.

Since light source 10, monochromator 11, photomultiplier tube 12, stepper motor 18, wavelength gears 19 and plotter-scriber 20 may be of conventional design, exhaustive discussion of these items will not be provided herein to avoid prolixity.

Briefly, however, light source 10 may comprise a tungsten lamp or deutrium lamp or inductively coupled plasma or any other suitable lamp. Monochromator 11 generally has an entrance slit 21 for receiving light 22, a dispersion element such as a prism or diffraction grating 23, a so-called Rowland's circle 24, a plasma chamber 26 and an exit slit 27 for directing monochromatic light 28 (shown as a solid line in FIG. 4) onto a dynode of the photomultiplier (tube) 12. Prism 23 is rotated by a scan motor via wavelength gears 19 during the analysis to scan the entire spectrum of interest past slit 27. The scan motor employed in this embodiment is a stepper motor 18 having a rotor (not shown) which is rotated by means of discrete (digital) pulses 29, the speed being dependent on the frequency of pulses 29. The stepper motor 18 typically is energized from a wavelength motor driver which is ordinarily set to operate the motor at a selected scan rate. Stepper motor 18 is coupled 20 to the wavelength gears 19. The wavelength gears 19, which may include a cam or other means, are coupled to the prism 23 for correspondingly rotating prism 23 with a rotor displacement or rotation.

As noted above, the prior art spectrophotometers utilized an asynchronous stepper motor actuation or drive having a relatively slow scan rate. The scan rate and stepper motor drive pulse repetition rate were selected in order to generally insure that the natural mechanical vibrations or oscillations of the rotor and prism 23, following a drive pulse initiated displacement thereof, had ended or terminated prior to effecting any data acquisition. Typically, rotor and prism natural vibrations following such a displacement may and typically do exist for a period approximately between 60 milliseconds and 80 milliseconds or more. Thus, the prior art spectrophotometers typically have a data aquisition scan rate which is somewhat slower than this rotor displacement vibration period in order to insure a sample test with a monochromatic light 28, i.e., with rotor and prism in an at rest state.

Accordingly, the basic concept of the present invention is to provide a spectrophotometer system wherein data acquisition conversion is effected during each corresponding portion of the rotor-prism (displacement) vibration/oscillation period. In this manner, since termination of the rotor-prism vibrations is obviated, a relatively fast scan or data throughput rate may be achieved.

The phase-lock-loop (P.L.L.) frequency multiplier 15 may be of conventional design having its input coupled, via lead 31, to the 60 hertz line frequency power source 14. The basic function of the P.L.L. frequency multiplier 15 is to provide a plurality of discrete signals ranging in frequency, for example, from the 60 hertz line frequency to a predetermined harmonic of the line frequency. These discrete signals f. line through N×f. line are coupled, via a plurality of leads or bus 32, to microprocessor 16.

Figure 2:
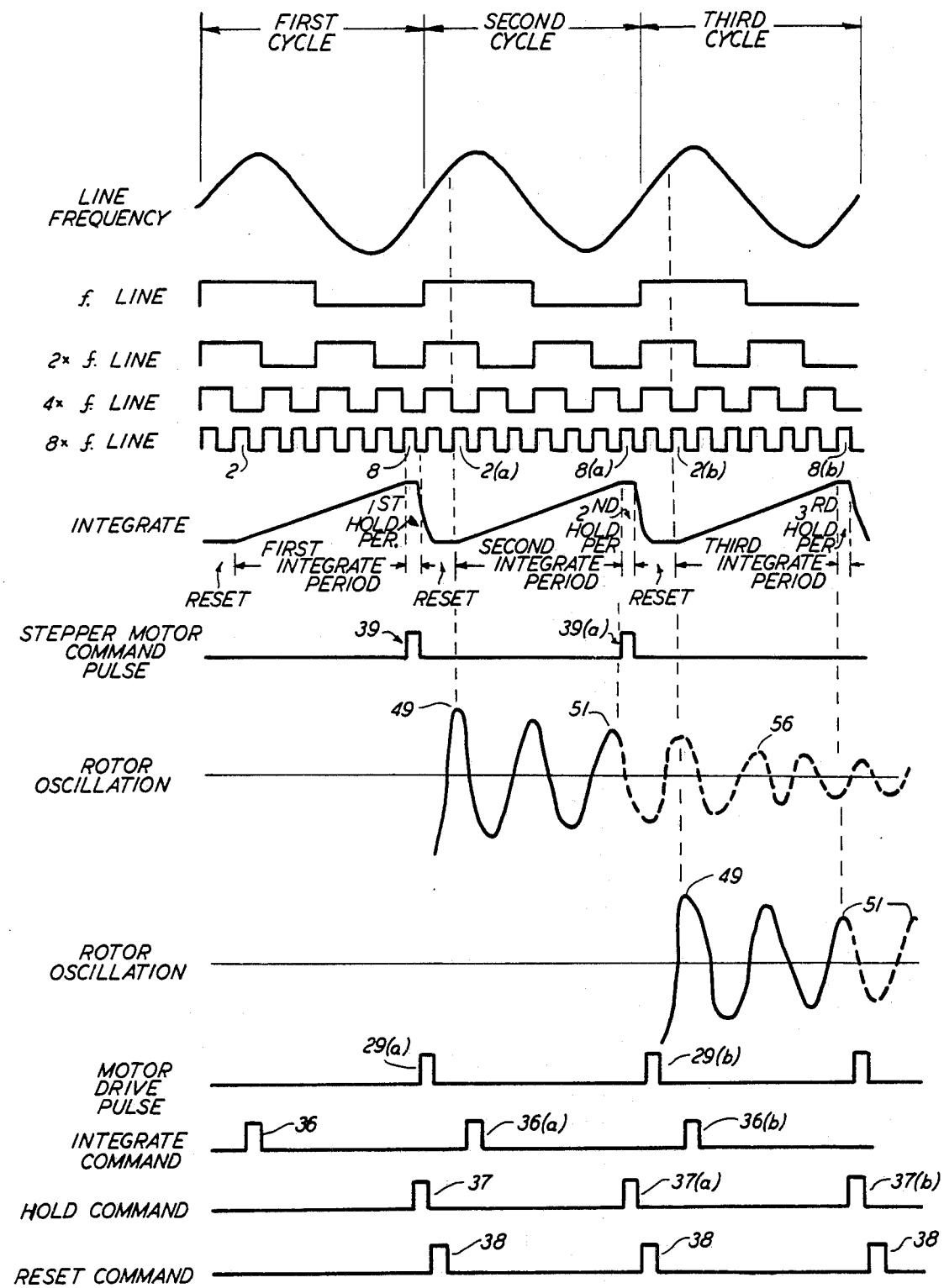
FIG. 2 is a waveform diagram for explaining the operation of the embodiment in FIG. 1.
Figure 3:
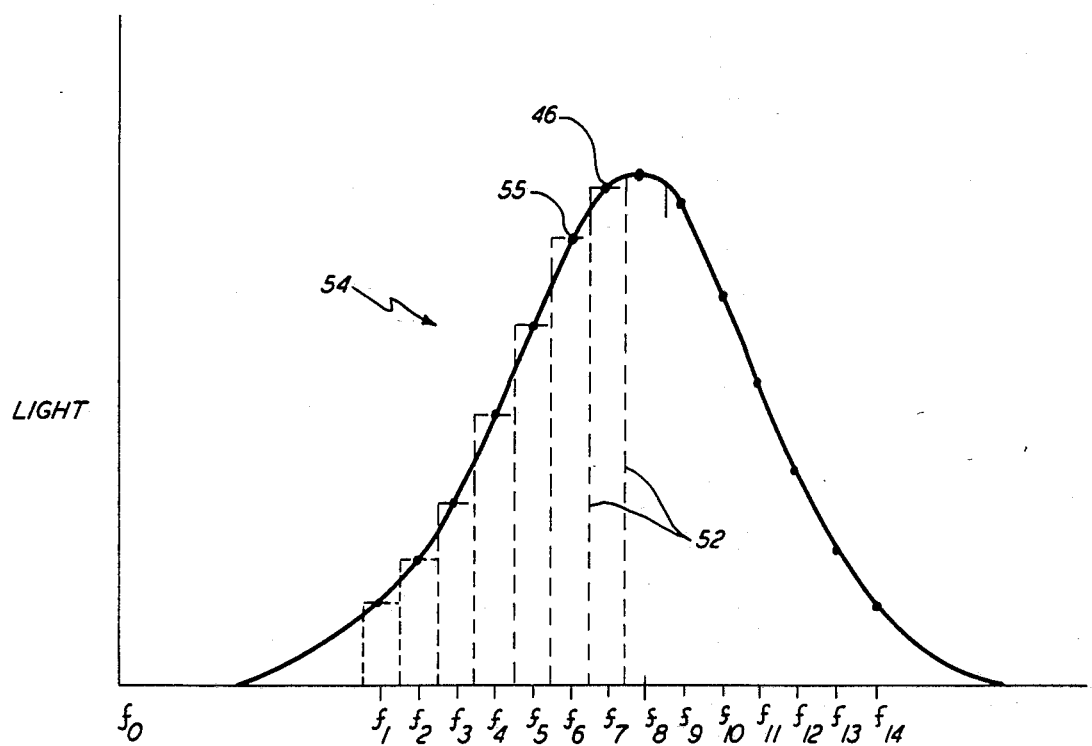
FIG. 3 is an illustration of a plotter-scriber graph.

Microprocessor 16 is coupled via signal or data bus 33 and leads 34,35 to the data acquisition electronics 13, stepper motor drive electronics 17 and to plotter-scriber 20, respectively. Basically, microprocessor 16 serves to provide control signals to synchronize the stepper motor and the data acquisition conversion to the line frequency. The control signals generally include (see FIG. 2), in accordance with the invention, an integrate signal 36, a hold signal 37, a reset signal 38 and a drive control signal 39. The control signals are generated generally during the same recurring period or portion of each cycle of the line frequency f. line. Following each integrate period, the signal data at the data acquisition electronics 13, as will be discussed more fully hereinafter, is coupled via lead 40 of bus 33 and read/-measured by microprocessor 16, which then provides a plot signal (not shown) via lead 35 to plotter-scriber 20. It is the plot signals which cause plotter-scriber 20 to generate the frequency VS. light intensity graph as illustrated in FIG. 3.

The data acquisition electronics 13 is coupled via lead 42 to the signal output of photomultiplier 12. This signal output generally corresponds to the light energy 43 transmitted through the sample or plasma under test in the monochromator.

The stepper motor drive electronics 17 in response to drive control signal 39 generate a corresponding drive pulse 29 which is coupled via lead 41 to stepper motor 18.

As can be recognized from the above, the stepper motor 18, wavelength gears 19 and monochromator 11 are, in accordance with the present invention, caused to function at a scan rate synchronized to the line frequency. How this affects the data being measured will now be described with particular reference to FIG. 2.

For ease of explanation, it will first be assumed that the system is instantaneously actuated at a period with the line frequency going positive from the zero (0) axis crossing. At this time, the P.L.L. frequency multiplier 15 is generating a plurality of positive going pulses f. line through 8×f. line, with leading edges corresponding with the zero axis crossing of the line frequency. These pulses range in frequency as multiple harmonics of the line frequency. The number of such signals N×f. line being selected based on the resolution desired.

For ease of understanding, it will also be assumed that the 8×f. line is being utilized by microprocessor 16 as the basic timing signal. It being recognized that microprocessor 16 may utilize any combination of these pulses f. line through N×f. line as enabling (gate) timing pulses.

At this time it is also being assumed that light source 10 is providing a light 22 to monochromator 11, which, in turn, is passing or directing this first light frequency (not shown) through a sample or plasma. The amount of the light passing through is characteristic of the plasma.

At the second leading edge of the 8×f. line, i.e., pulse two, following the zero axis crossing of the line frequency, microprocessor 16 provides an integrate signal 36 to the data acquisition electronics 13. Data acquisition electronics 13 in response to integrate signal 36 measures the voltage/current signal information being provided by photomultiplier 12. This measuring or sampling is indicated as an integration ramp effected during the first integrate period of the integrate waveform. This (first) integrate signal information is indicative of the sample at the monochromatic light frequency passing through the sample.

With the detection of the leading edge of pulse 8, microprocessor 16 provides the hold command or control signal 37 to the data acquisition electronics 13. Hold command signal 37 causes the data acquisition electronics 13 to hold and transmit digital data signals 45, via lead 40 of bus 33, to microprocessor 16. In response to this digital data signal 45 microprocessor 16 provides a signal (not shown) to plotter-scriber 20 which generates, for example, waveform marking 46 (see FIG. 3).

With the detection of the trailing edge of pulse 8, microprocessor 16 provides reset pulse 38 to the data acquisition electronics 13, which effects an internal reset or discharge of the stored integrated signal during the first reset period. This discharging or resetting is illustrated by line 47 of the integrate signal. This reset is effected prior to the start of the second integrate period, i.e., pulse 2($a$) of the 8×f. line, which occurs during the second cycle of the line frequency.

As can be seen with reference to the stepper motor command pulse waveforms and the hold command waveforms (FIG. 2), the stepper motor drive electronics 17 is provided with an increment command pulse 39 generally coincidental with the hold command pulse signal. The stepper motor drive electronics 17 in response to each command pulse 39 provides a corresponding drive pulse 29 causing stepper motor 18 to increment or advance to its next rotor position.

Figure 4:
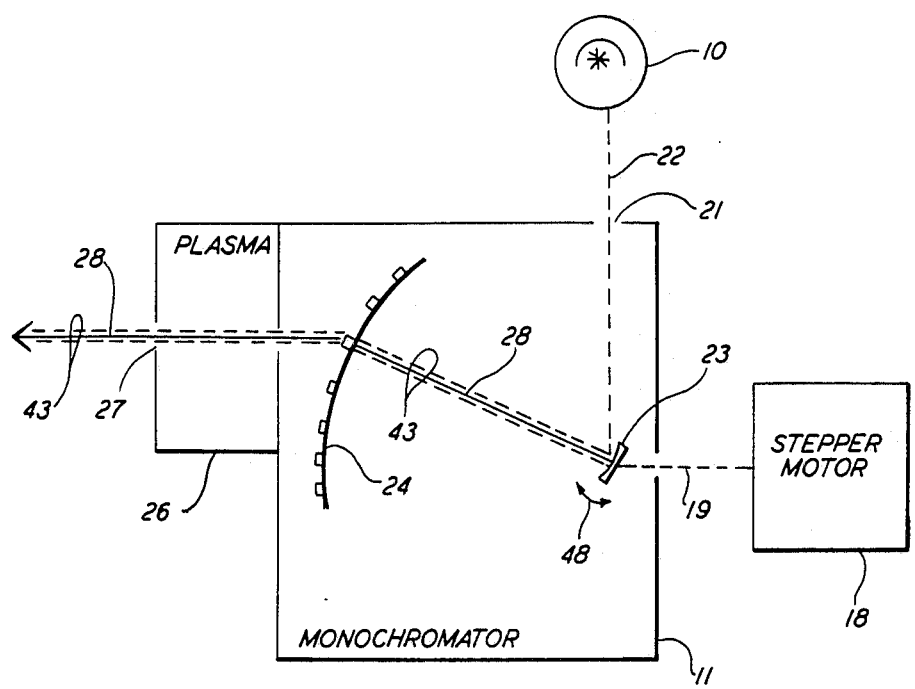
FIG. 4 is a diagrammatical illustration of the operation of a monochromator in accordance with the invention.

With a rotor displacement, wavelength gears 19 cause prism 23 to rotate to a next or sequential angle of diffraction as illustrated in FIG. 4. It should also be recalled from the above discussion that each rotor displacement results in a period of vibration or oscillation about the predetermined rotor and prism step wavelength position. The rotor vibrations are partially depicted in FIG. 2 as rotor oscillation periods 1 and 2. The prism 23 vibrations are depicted by double headed arrow 48.

The second integrate period is initiated at the leading edge of pulse 36($a$) which is taking place during the second cycle of the line frequency. For ease of understanding, the rotor oscillation following stepper motor drive pulse 29($a$) is depicted as being at the apex 49 of its first cycle of oscillation at the start of the second integrate period. The rotor oscillations continue during the entire second integrate period.

During this second integrate period, prism 23 is also experiencing corresponding vibrations 48 about a predetermined diffraction wavelength position. Thus, generally speaking, prism 23 vibrations occur in synchronism with the rotor oscillations and, therefore, for ease of understanding and mental image, may be viewed as identical to the rotor oscillation waveforms.

With prism 23 vibrating 48 about its monochromatic wavelength position, a narrow band of light frequencies 43 is directed through the plasma or sample within chamber 26 and onto photomultiplier 12. The band of light frequencies 43 include the desired monochromatic light 28 (shown in solid line) and frequencies above and below the monochromatic light (shown as dash lines). A corresponding electrical signal is then generated by photomultiplier 12 and coupled to the data acquisition electronics 13. p Accordingly, it can be seen tht data acquisition is being effected during the second integrate period which occurs coincidentally with rotor displacement oscillation and, therefore, prism 23 oscillations 48 as depicted between apex 49 and 51 of the rotor oscillation period 1 waveforms.

During the second hold period, the analog information acquired by the data acquisition electronics 13 during the second integrate period is converted into a corresponding digital signal 45 which is coupled, via bus 33, to microprocessor 16. Microprocessor 16, in turn, provides a corresponding signal to plotter-scriber 20 for effecting the generation of a representative graph of the data, for example, light energy at the various selected wavelengths.

The signal information corresponding or indicative of the predetermined monochromatic light frequency, for example, f7, and its associated light frequency band, for example, 43, are depicted in phantom outline 52. It being understood that each monochromatic light and its associated band or bundle of light frequency data are converted into a representative analog signal by photomultiplier 12. This analog signal is integrated and converted into a representative digital signal. Each such digital signal is converted by microprocessor 16 for use as a graph point, for example 46, which is utilized by plotter-scriber 20 for effecting a graph 54 being generally representative of the data throughput conversion of the selected light frequencies, for example, f1 through f14.

With reference again to FIG. 2, it can be readily seen that following the second integrate period, another stepper motor command pulse 39($a$) is provided by microprocessor 16. Command pulse 39($a$) causes a drive pulse 29($b$) to be provided to the stepper motor 18. This drive pulse 29($b$) causes a sequential displacement and prism 23 displacement to the next wavelength position.

Next, microprocessor 16 provides an integrate signal 36($b$) to the data acquisition electronics 13 to effect a data acquisition conversion during the third integrate period. This data acquisition conversion is also effected durin the natural oscillation period of the stepper motor rotor and prism 23 following advancement to this new wavelength position (not shown).

From the above, and with reference to the rotor oscillation periods 1 and 2 waveforms, it should be recognized that the third integrate period data conversion begins and ends substantially at the same points, i.e., apex 49 and 51, of the mechanical oscillation events of prism 23. The remaining occurences as decribed with regard to the second integrate period are repeated to effect another plot line signal, for example, corresponding to graph point 55.

The procedure discussed above with regard to the second and third integrate periods of data conversion are repeated a plurality of times to obtain graph 54.

It should now be appreciated that the maximum data scan rate or data throughput speed, according to the present invention, is no longer defined by the rotor/prism full mechanical oscillation period. In other words, the present invention effects data conversion while the rotor/prism is experiencing oscillations or vibrations following rotor/prism wavelength displacement. This is illustrated by the solid line waveforms of rotor oscillation periods 1 and 2. Following each integrate period, the rotor and prism 23 are advanced to the next wavelength position.

The dash-line 56 waveform portion of rotor oscillation periods 1 and 2 are illustrated to emphasize that the rotor/prism in the prior art spectrophotometers continue to oscillate for a relatively long period, for example, approximately 60 milliseconds, until the mechanical oscillations subside, at which point the data conversion was effected. Therefore, maximum data throughput speed in the prior art systems was inherently limited by the time required for the rotor/prism displacement vibrations to substantially terminate.

In total contrast to the prior art, the spectrophotometer system according to the present invention effects data conversion during a period when the rotor/prism is oscillating (see solid line of rotor oscillation waveforms) and then prior to a termination of the rotor/prism oscillations (see dash-line of rotor oscillation waveforms), changes the wavelength to obtain the next data conversion. The data conversion rate is synchronized to the line frequency and, therefore, provides a relatively speedy data conversion system and method, for example, each wavelength data conversion corresponding to a cycle of the line frequency.

It should also be noted at this time that the above described embodiment of the invention provides phase integrated data acquisition which enables equal signal integrated ratios on both sides of the zero axis crossing of the input line frequency with its related hum line noise and any optical stray light pickup. Because the noise signals are equal and opposite in phase, even if the line frequency changes, the final integrated signal substantially cancels out these spurious noise sources due to the tracking of the phase lock loop decoding. Although the above described system timing diagrams (see FIG. 2) illustrate an analog type of integration, the present invention may be utilized with a digital type of sampled numerical integration. Also, the synchronization according to the present invention enables a faster and more accurate wavelength profile data acquisition with the benefit of an approximately 40 decibel line noise and stray light noise rejection.

It is to be understood that the above described embodiment is illustrative of the application of the principles of the present invention. Other arrangements may be devised by those skilled in the art without departing from the spirit and scope of the claimed invention.

However, the fundamental invention concept of measuring the output light intensity of a so-called monochromator, i.e., data conversion, while the grating, prism or like element is in a state of vibration, oscillation or on-the-fly, will remain the same. Therefore, the term "prism displacement" shall hereinafter mean that the grating or prism or like element is in a state of oscillation, or vibration, or displacement motion. The term "data conversion" shall mean a detecting and measuring of an output light intensity of monochromator or like device.

We claim:

1. A sequential spectrophotometer system having a light source, a scanning monochromator device having a movable prism, a stepper motor coupled to the monochromator for periodically changing the monochromator device wavelength, a photomultiplier for detecting the intensity of the output light from the monochromator device and providing an electrical signal corresponding thereto, data acquisition means responsive to the electrical signal from the photomultiplier for measuring same, and a recording device for providing indicia representative of the measured electrical signal, the improvement comprising:
   means for effecting a data acquisition during a prism displacement.

2. A sequential spectrophotometer system as in claim 1, wherein:
   the means for effecting a data acquisition during a prism displacement is synchronized to the line frequency whereby said data acquisition occurs during a cycle of said line frequency.

3. A sequential spectrophotometer system as in claim 2, wherein:
   the line frequency is approximately 60 hertz.

4. A sequential spectrophotometer system as in claim 1, wherein:
   the means for effecting a data acquisition during a prism displacement measures light intensity of a band of wavelengths about a monochromatic wavelength, said band of wavelength being dependent on the amplitude of oscillations of the monochromator prism about a predetermined wavelength disposition of the monochromator prism.

5. A sequential spectrophotometer system as in claim 1, wherein:
   the means for effecting a data acquisition during a prism displacement effects a wavelength change prior to termination of the prism displacement.

6. A sequential spectrophotometer system as in claim 1, wherein:
   the means for effecting a data acquisition during a prism displacement being synchronized to the line frequency for causing the recording device to display indicia representative of an integrated electrical signal being measured during a portion of time when the line frequency goes from above to below its zero axis crossing.

7. A sequential spectrophotometer system as in claim 1, wherein:
   the means for effecting a data acquisition during a prism displacement provides phase integrated data acquisition to enable equal signal integrate ratios on both sides of a zero axis crossing of an input power line frequency whereby spurious noise is substantially reduced for the acquisition data.

8. A sequential spectrophotometer system as in claim 1, wherein:
   the means for effecting data acquisition includes a phase lock loop frequency multiplier, a microprocessor, and data acquisition electronic means for synchronizing both the data acquisition means and the stepper motor sequential wavelength change with the input power line frequency.

9. A sequential spectrophotometer system being powered from a line frequency power source comprising:
   means responsive to the line frequency for providing a plurality of harmonic signal frequencies of the line frequency;
   means responsive to said harmonic signal frequencies for providing a plurality of control signals;
   means responsive to a respective one of said control signals for providing a drive signal;
   stepper motor means being synchronized to the line frequency and responsive to said drive signal for incrementally rotating its rotor;
   a source of light;
   means responsive to said light and the rotational disposition of the rotor for providing a diffracted light generally corresponding with the rotational disposition of the rotor;
   means responsive to said diffracted light for providing a corresponding electrical signal;

means synchronized to the line frequency and responsive to said control signals and said electrical signal for providing a data acquisition conversion signal representative of said diffracted light during a rotor displacement; and means responsive to said data acquisition conversion signal for providing an indicia representative thereof;

whereby data acquisition conversion being effected during a rotor displacement.

10. A sequential spectrophotometer system as in claim 9, wherein:

the means responsive to the line frequency includes a phase lock loop frequency multiplier;

the harmonic responsive means includes a microprocessor;

the means providing the drive signal includes stepper motor drive electronics;

the means for providing the diffracted light includes a monochromator having a prism;

the means for providing the electrical signal includes a photomultiplier;

the means for providing the data acquisition conversion signal includes data acquisition electronics operatively coupled to said microprocessor and said photomultiplier for effecting data conversion;

whereby the data conversion is effected with said prism undergoing a prism displacement.

11. A synchronous wavelength drive and data acquisition conversion circuit network for a sequential spectrophotometer system being operated from a line frequency power source, said spectrophotometer having a plotter-scriber, a stepper motor, a monochromator having a prism, a source of light and a photomultiplier, comprising:

data acquisition means coupled to the photomultiplier for providing data conversion synchronized to the line frequency; and control mans for synchronizing the data conversion with prism displacement of the monochromator prism to effect data conversion during a line frequency synchronized relatively small portion of the prism displacement occurring shortly after a wavelength change and within a respective cycle time of the line frequency.

12. A method of synchronizing the data conversion of a spectrophotometer system having a diffraction prism and a stepper motor operatively coupled to the diffraction prism with the line frequency, comprising the steps of:

providing a plurality of drive pulses to the stepper motor each being synchronized to a first corresponding portion of each respective cycle of the line frequency;

providing a plurality of data conversion command pulses to the data acquisition means of the spectrophotometer system each being synchronized to a second corresponding portion of each cycle of the line frequency; and effecting a respective data conversion in response to each data conversion command pulse during a corresponding portion of a respective prism displacement.

* * * * *